United States Patent [19]
Ahlborn et al.

[11] Patent Number: 5,479,863
[45] Date of Patent: Jan. 2, 1996

[54] RAILROAD FREIGHT CAR

[75] Inventors: Günter Ahlborn, Siegen; Herbert Büdenbender, Netphen, both of Germany

[73] Assignee: ABB Henschel Waggon Union GmbH, Berlin, Germany

[21] Appl. No.: 243,156

[22] Filed: May 16, 1994

[30] Foreign Application Priority Data

May 8, 1993 [DE]  Germany ............................ 43 16 535.4

[51] Int. Cl.$^6$ .................................. B61F 5/30; B61F 5/32
[52] U.S. Cl. ................................... 105/199.5; 105/218.2; 105/224.05
[58] Field of Search ............................... 105/164, 199.5, 105/218.2, 224.05, 218.1

[56] References Cited

U.S. PATENT DOCUMENTS 3,707,926  1/1973  Ellzey ................................ 105/218.2

FOREIGN PATENT DOCUMENTS 92001595  2/1992  WIPO ................................ 105/199.5

Primary Examiner—Robert J. Oberleitner
Assistant Examiner—Kevin D. Rutherford
Attorney, Agent, or Firm—Herbert L. Lerner; Laurence A. Greenberg

[57] ABSTRACT

A railroad freight car includes a loading platform and two wheelsets, two double-axle running gears or two bogies, and cushioning is effected by leaf suspension springs suspended by links from spring brackets. The object of the invention is to provide a railroad freight car by using simple, economic devices, in which a facility is provided for driving the railroad freight car beneath cargoes, especially swap bodies or interchangeable containers, for raising the loading platform and, following the reception of the cargo, for lowering the loading platform back into a travel position so as to enable the railroad freight car to be loaded and unloaded independently from loading appliances extraneous to the car. This object is achieved by providing a lifting element interposed between each suspension ring and an associated spring bracket of the loading platform or of the bogie frame. The lifting element can raise the loading platform relative to the wheelsets or to the double-axle running gear or with the bogie frame, relative to its wheelsets.

13 Claims, 5 Drawing Sheets

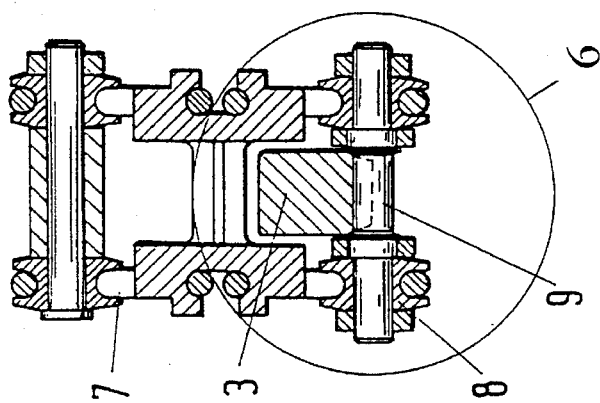
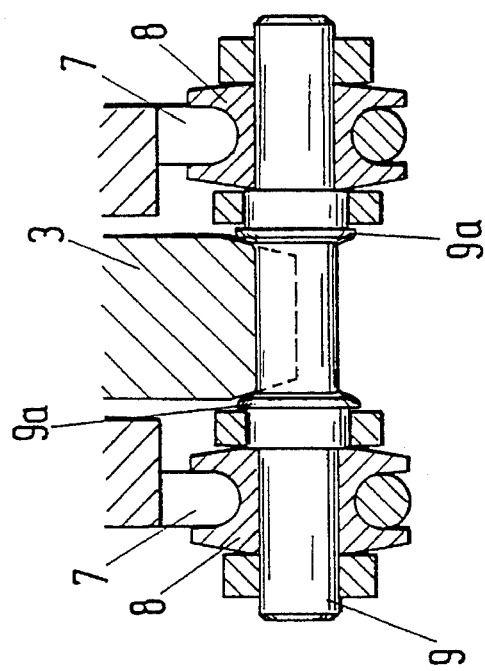
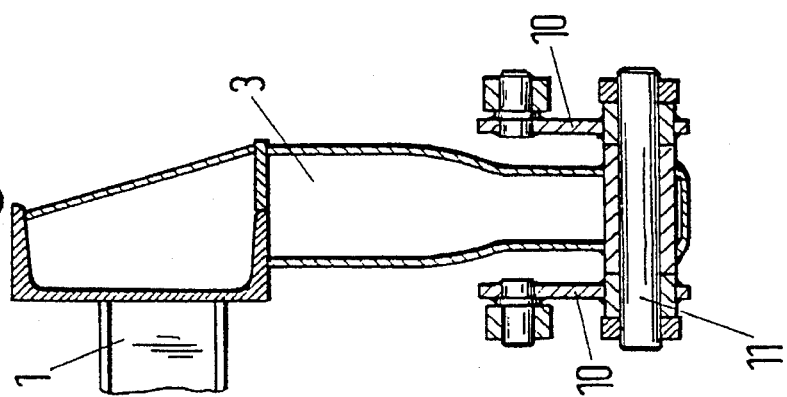

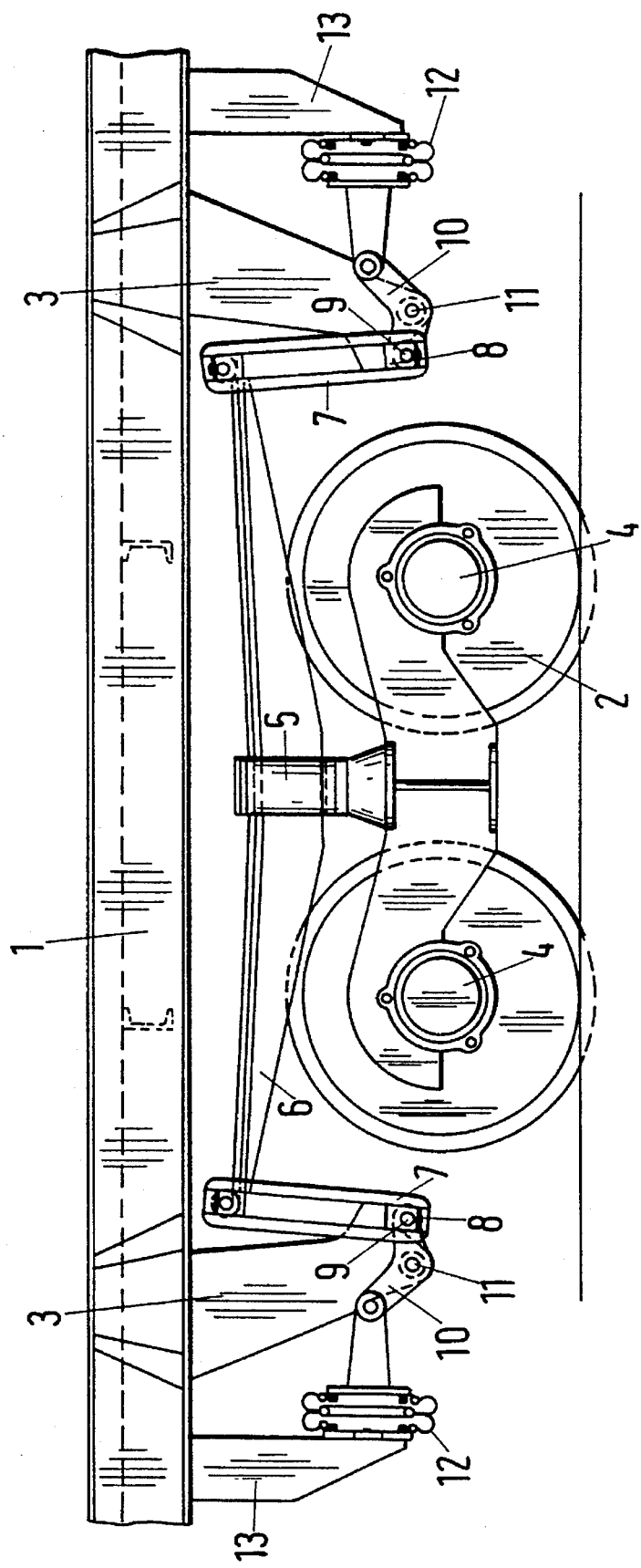

RAILROAD FREIGHT CAR

BACKGROUND OF THE INVENTION

1. Field of the Invention

The invention relates to a railroad freight car, essentially including a loading platform and two wheelsets, two double-axle running gears or two bogies, the loading platform being cushioned against the wheelsets or the double-axle running gears or the loading platform with the bogie frame being cushioned against the wheelsets of the bogies by means of leaf suspension springs suspended by links from spring brackets, the guidance of the wheelsets or of the double-axle running gears below the loading platform or the guidance of the wheelsets into the bogie frame allowing a vertical displacement and limitedly horizontal out-turn of the wheelsets relative to the loading platform or to the bogie frame, respectively, or of the double-axle running gear relative to the loading platform.

Railroad freight cars having a loading platform, or so-called "flat cars", are known to have running gears which include single axles, double-axle running gears, or trucks or bogies. Such flat cars having a loading platform are conventionally loaded or unloaded by means of a crane or fork-lift truck. However, in order to provide for the economic loading or unloading of certain cargoes, for example of swap bodies or interchangeable containers standing on supporting legs, it is necessary to provide a device which allows the railroad freight car to receive or deposit the swap bodies or interchangeable containers automatically without loading appliances. The facility to alter the platform height, which is offered, for example, by the pneumatic suspension of bogies belonging to passenger train carriages, does not exist in railroad freight cars, since for economic reasons they are not equipped with trucks or bogies having pneumatic suspensions.

It is already known from practice, in the case of heavy-duty vehicles serving, in particular, for the transport of large transformers, to lower and raise the load mounting, including dump-in or scoop carriers, by means of hydraulic devices, and therefore to receive and deposit the load. However, those devices are very complex and can only be used in those complex heavy-duty transport vehicles which are equipped with dump-in or scoop carriers. It is further known to integrate into the loading platform of a railroad freight car a lift system, by means of which the railroad freight car is able to receive swap bodies or interchangeable containers. For that purpose, a truck transports the swap body or interchangeable container onto the stretch of rail, lowers it over the track, with the supporting legs of the swap body or interchangeable container extended, and drives back out of the track. A railroad car then rolls beneath the swap body or interchangeable container up to a defined take-up point. The lift structure of the railroad car is then raised, so that the supporting legs lose their contact with the ground and can be mechanically retracted. The train convoy, which is thus laden, can then leave the track. However, that system is very complex and expensive and is not suitable for economical traffic.

In addition, German Published, Non-Prosecuted Application DE 40 23 367 A has disclosed a railroad freight car essentially including a loading platform and two single axles or two double-axle running gears having fixedly clamped axles, wherein the loading platform is mounted on the single axle or the double-axle running gears by means of leaf suspension springs and the guidance of the single axles or of the double-axle running gear below the loading platform merely includes vertical guide elements or axle-bearing stems on the loading platform and the axle bearings of the single axle or the frame of the double-axle running gear, which enable a vertical displacement and a limitedly horizontal out-turn and transverse displacement of the single axle or double-axle running gear relative to the loading platform.

Lifting elements are disposed between the axle bearing housings of the single axle or the frame of the double-axle running gear and the leaf suspension springs. The loading platform with the leaf suspension springs can be raised relative to the single axle or to the double-axle running gear by means of the lifting elements. That construction enables railroad freight cars, having a running gear which includes single axles or double-axle running gears, to be economically constructed in such a way that the reception of swap bodies or interchangeable containers, in particular, is made possible without extraneous loading appliances. Nor is it necessary, for loading and unloading, to release any guys or guides between the loading platform and the running gear.

A drawback in the above-mentioned structure is the necessity to provide separate axle bearing housings for the axle bearings and separate spring buckles for the leaf suspension springs. A further drawback is the fact that the available installation space for the lifting elements is very small and, for that reason, a large amount of energy is consumed in order to raise the loading platform. A further drawback of that structure is the fact that the above-mentioned device cannot be used in railroad freight cars having running gears which include trucks or bogies, since between the loading bridge and the bogie frame a fixed connection is provided, by means of bogie pins or swivel rings, which is not releasable during operating usage.

2. Summary of the Invention

It is accordingly an object of the invention to provide a railroad freight car, which overcomes the hereinafore-mentioned disadvantages of the heretofore-known devices of this general type and which does so in such a way that, while using simple, economical means, a facility is provided for driving the railroad freight car beneath cargoes, especially swap bodies or interchangeable containers, for raising a loading platform and, following the reception of the cargo, for lowering the loading platform back into a travel position so as to enable the railroad freight car to be loaded and unloaded independently from loading appliances extraneous to the car, with the railroad freight car being able to be equipped with all standard conventional running gears, for example single axles, double-axle running gears, or trucks or bogies.

With the foregoing and other objects in view there is provided, in accordance with the invention, a railroad freight car, comprising a loading platform; two wheelsets, two double-axle running gears or two bogies having a bogie frame; spring brackets; leaf suspension springs; link suspension mountings suspending the leaf suspension springs from the spring brackets; the loading platform being cushioned against the wheelsets or the double-axle running gears or the loading platform with the bogie frame being cushioned against the wheelsets of the bogies by the leaf suspension springs; guidance of the wheelsets or of the double-axle running gears below the loading platform or guidance of the wheelsets into the bogie frame allowing a vertical displacement and limitedly horizontal out-turn of the wheelsets relative to the loading platform or to the bogie frame respectively or of the double-axle running gear relative to the loading platform; and lifting elements each being interposed between a respective one of the link suspension mountings and a respective one of the spring brackets of the loading platform or the bogie frame, for raising the loading platform relative to the wheelsets or to the double-axle running gear respectively or, with the bogie frame, relative to the wheelsets.

In accordance with another feature of the invention, the lifting element includes a lever which is hinge-mounted on the spring bracket and can be actuated by a drive mechanism.

In accordance with a further feature of the invention, the drive mechanism includes a hydraulic or pneumatic working cylinder, an electric motor or a mechanical gear system.

In accordance with an added feature of the invention, the lever is an angular lever which is hinge-mounted by a central pivot bearing on the spring bracket, and which is connected at one free end in an articulated manner to the suspension ring and at the other free end in an articulated manner to the drive mechanism. The invention enables railroad freight cars of the type stated in the introduction, having a running gear which includes single axles, double-axle running gears or bogies, to be economically constructed in such a way that the reception of swap bodies or interchangeable containers or extraneous loading appliances, in particular, is made possible. Nor is it necessary according to the invention, for the loading and unloading of the railroad freight car, to release any guys or guides between the loading platform and a running gear.

In accordance with an additional feature of the invention, the lever is a double lever and each single part of the double lever is mounted on a respective side of the spring bracket.

In accordance with yet another feature of the invention, the suspension rings are mounted on the lever by means of a link bolt, and when the loading platform is lowered, the link bolt bears with its contacting surface frontally against the spring bracket.

In accordance with yet a further feature of the invention, the link bolt has at least one transverse stop at a distance from its longitudinal ends, which is form-lockingly connected to the spring bracket, horizontally in the transverse direction of the vehicle, when the loading platform is lowered. A form-locking connection is one which connects two elements together due to the shape of the elements themselves, as opposed to a force-locking connection, which locks the elements together by force external to the elements.

In accordance with a concomitant feature of the invention, each of the link bolts has two spaced apart transverse stops, each bearing from one side against one of the spring brackets when the loading platform is lowered.

As a result of this configuration of the lever and of the link bolt and its configuration on the spring bracket, horizontal forces are kept away from the lever. The depositing of the load from the spring, through the suspension rings, onto the spring bracket, is reliably effected in the same form as in the case of suspension links mounted directly on the spring bracket.

All in all, by virtue of the invention, a simple and economical facility is provided for raising or lowering the entire loading platform of the railroad freight car relative to its running gears, irrespective of the type of running gears, and therefore a facility is provided for easily receiving and depositing swap bodies or interchangeable containers, in particular.

Other features which are considered as characteristic for the invention are set forth in the appended claims.

Although the invention is illustrated and described herein as embodied in a railroad freight car, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a longitudinal-sectional view taken along a line III—III of FIG. 1, in the direction of the arrows;

FIG. 4 is a sectional view taken along the line IV—IV of FIG. 1, in the direction of the arrows;

FIG. 6 is an enlarged view of a portion A of FIG. 4.

FIG. 7 is a similar view of a railroad freight car according to FIG. 1 with double-axle gears.

DESCRIPTION OF THE PREFERRED EMBODIMENTS

Figure 1:
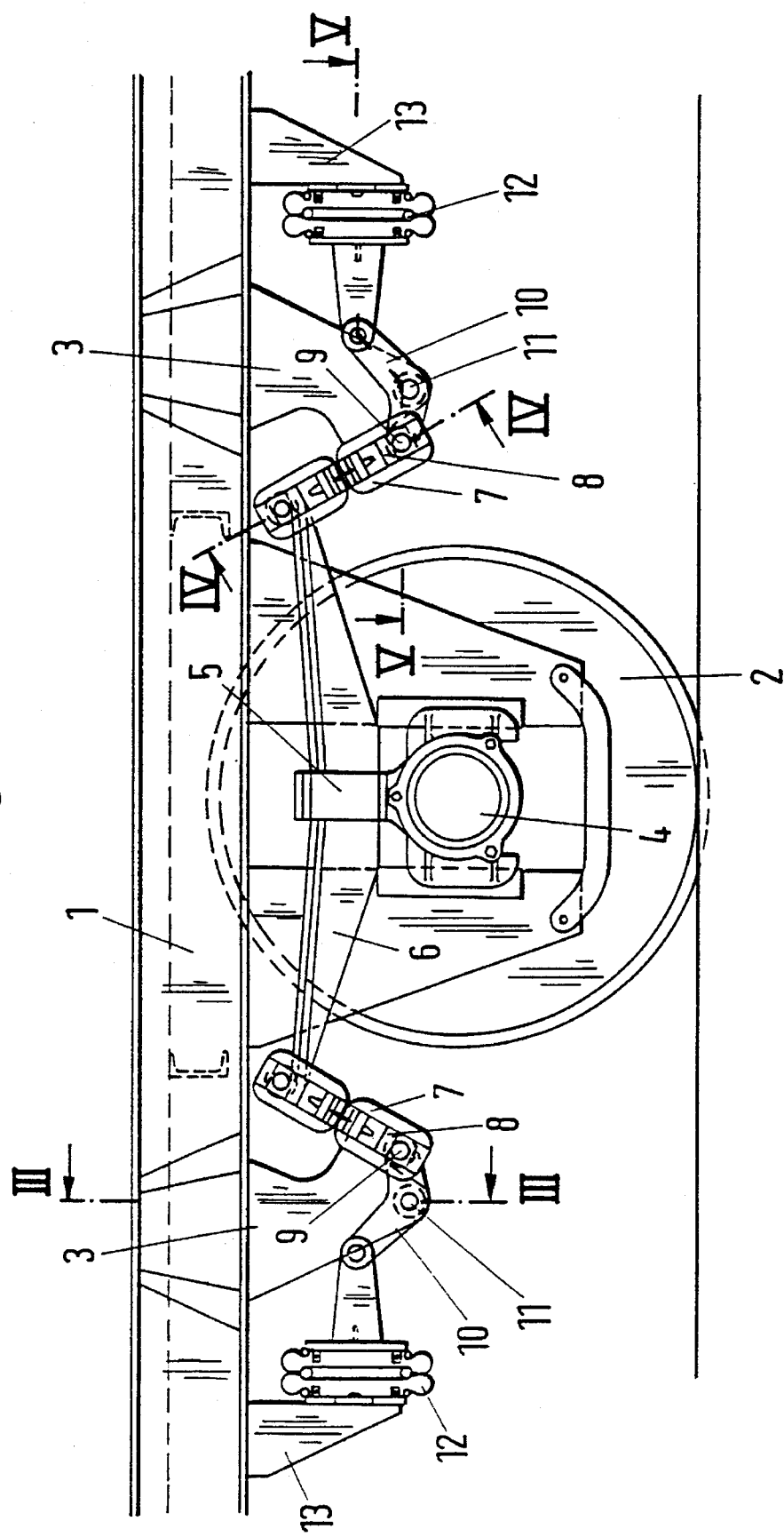
FIG. 1 is a fragmentary, diagrammatic, side-elevational view of a part of a railroad freight car with a part of a loading platform and with a running gear including single axles, according to the invention.
Figure 2:
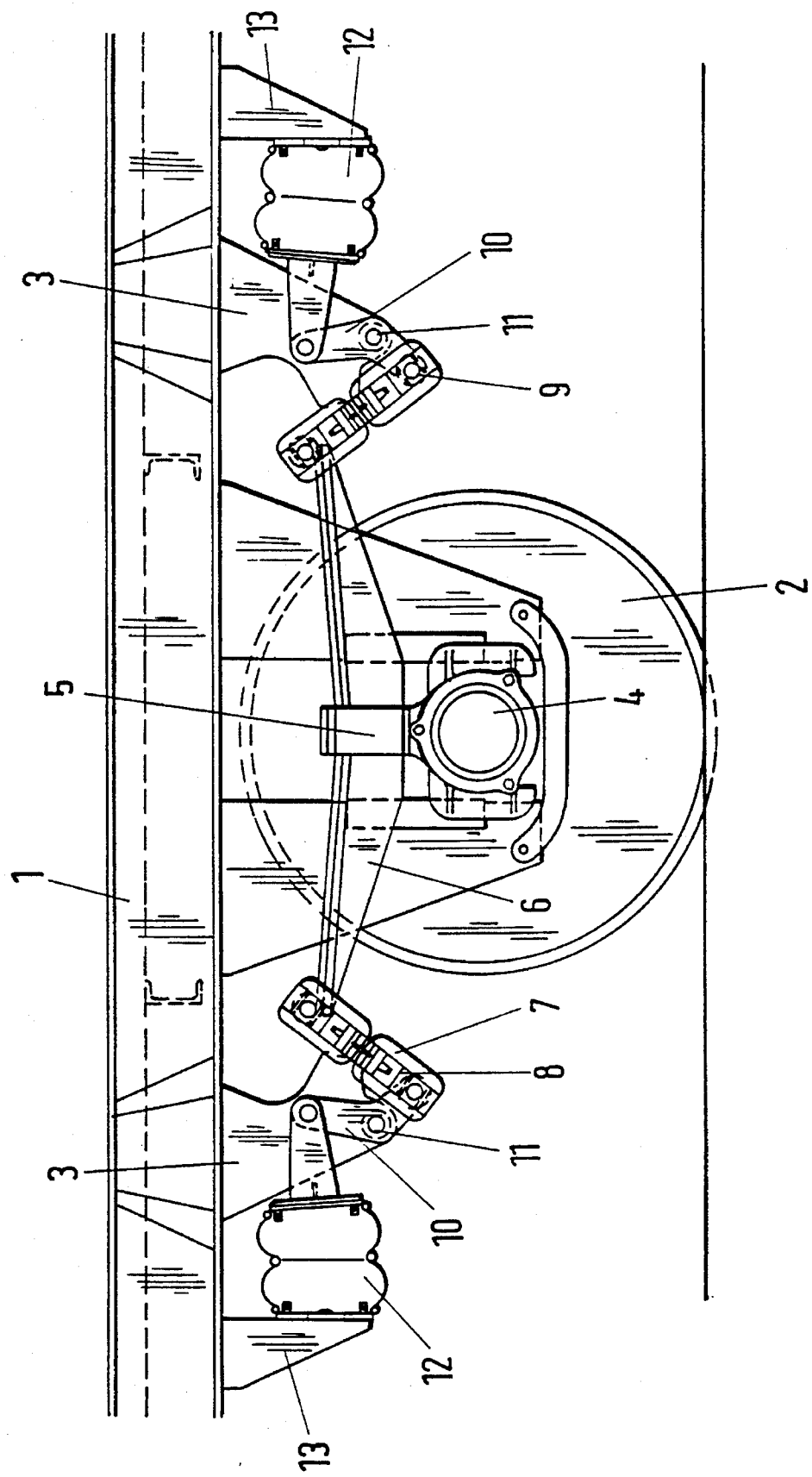
FIG. 2 is a similar view of the railroad freight car according to FIG. 1, with a raised loading platform.
Figure 5:
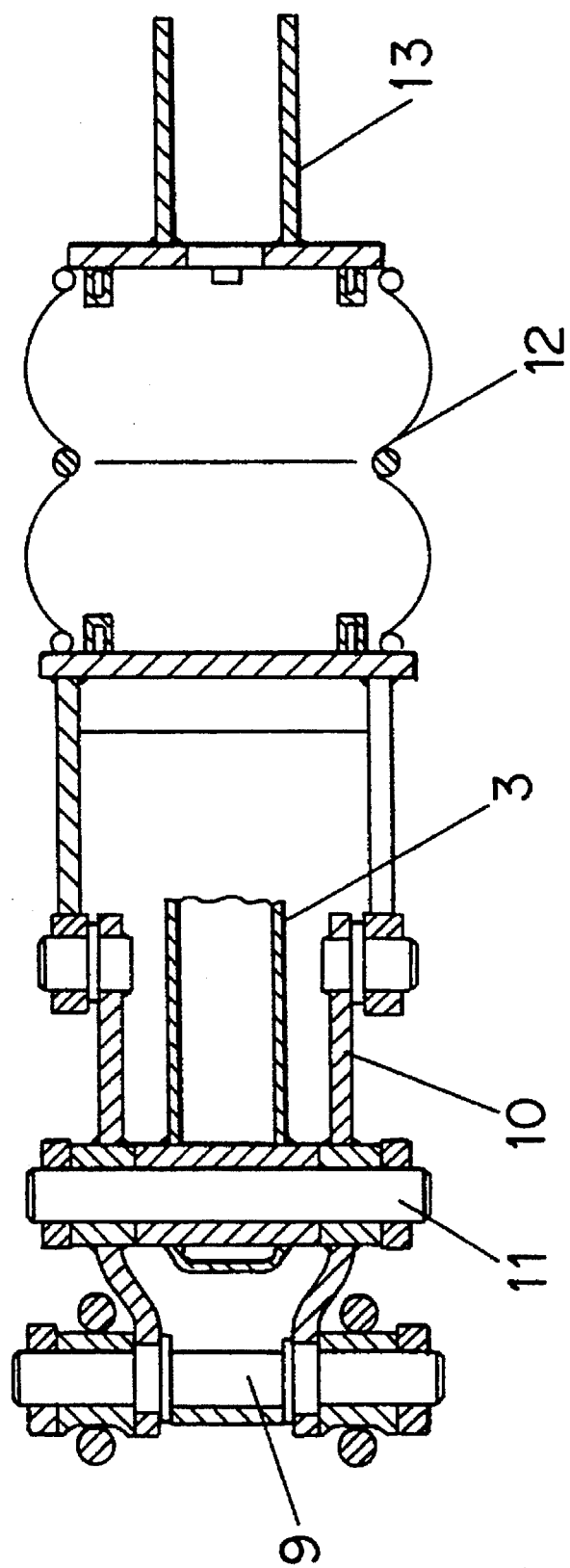
FIG. 5 is a cross-sectional view taken along the line V—V of FIG. 1, in the direction of the arrows.

Referring now in detail to the figures of the drawing as a whole, there is seen an illustration of the invention with reference to an illustrative embodiment of a twin-axle railroad freight car. The railroad freight car herein essentially includes a flat loading platform 1 and running gears including individual wheelsets 2. A respective downwardly pointing spring bracket 3 is fixedly disposed on the loading platform in front of and behind each wheel of each wheelset 2. Each wheel of each wheelset 2 has an axle bearing housing 4 which supports a leaf suspension spring 6 through a central spring buckle 5. The leaf suspension spring 6 is suspended at ends thereof by means of conventional link suspension mountings or rings 7. The link suspension mountings or rings 7 are in turn mounted by means of conventional link blocks 8 on link bolts 9. The link bolts 9 are each hinge-mounted on a first free end of an angular lever 10. The angular lever 10 is vertically hinge-mounted by a central pivot bearing 11 on the spring bracket 3. A second free end of the angular lever 10 is connected in an articulated manner to a drive mechanism 12. In the illustrated embodiment, the drive mechanism 12 is configured as a pneumatic cylinder. In the illustrative embodiment, the drive mechanism 12 is fixedly disposed on a bracket 13 of the loading platform 1 in such a way that it acts horizontally in a longitudinal direction of the vehicle.

According to other, non-represented illustrative embodiments of the invention, the drive mechanism 12 can be configured as a hydraulic cylinder, an electric motor or a mechanically acting gear system.

Each angular lever 10 is configured as a double lever, in which each individual part of the double lever is respectively laterally mounted, on one side, on the spring bracket 3 by the pivot bearing 11. As is seen in FIG. 6, the link bolt 9 receiving the link suspension mounting or ring 7 has a respective collar 9a on both sides of its longitudinal center.

When the loading platform 1 is lowered, the link bolt 9 bears frontally against the spring bracket 3 with a contacting surface thereof which is between the collars 9a. As a result of this bearing contact of the link bolt 9 against the spring bracket 3, the drive mechanism 12 and the angular lever 10 are kept away from any forces when the loading platform 1 is lowered, i.e. in the travel position of the railroad freight car. Horizontal transverse forces are additionally kept away from the angular lever 10 as a result of the lateral bearing contact of the collars 9a of the link bolt 9 against the spring bracket 3. The configuration of the link bolt 9 in the represented illustrative embodiment is only illustrative. Any other form-locking construction of the link bolt 9, acting in the transverse direction, and the corresponding configuration of the spring bracket 3, might also be chosen.

In order to raise the loading platform 1, each drive mechanism 12 is merely activated and the loading platform 1 is raised by means of the link suspension mountings or rings 7, acting as a fixed point, and the angular lever 10. The lowering of the loading platform 1 is carried out in the reverse order.

The represented illustrative embodiment of the invention can be applied in an identical manner in railroad freight cars having two single wheelsets and in railroad freight cars having two double-axle running gears. In the case of railroad freight cars having trucks or bogies, deflecting elements which are non-essential to the invention are merely interposed in the truck or bogie frame, between the angular lever 10 and drive mechanism 12.

We claim:

1. A railroad freight car, comprising:

a loading platform;

at least one wheelset;

spring brackets;

leaf suspension springs;

link suspension mountings suspending said leaf suspension springs from said spring brackets;

said loading platform being cushioned against said at least one wheelset by said leaf suspension springs;

guidance of said at least one wheelset allowing a vertical displacement and limitedly horizontal out-turn of said at least one wheelset relative to said loading platform; and lifting elements each being interposed between a respective one of said link suspension mountings and a respective one of said spring brackets for raising said loading platform relative to said at least one wheelset.

2. The railroad freight car according to claim 1, wherein each of said lifting elements include a lever being hinge-mounted on one of said spring brackets and a drive mechanism actuating said lever.

3. The railroad freight car according to claim 2, wherein said drive mechanism includes a hydraulic working cylinder.

4. The railroad freight car according to claim 2, wherein said drive mechanism includes a pneumatic working cylinder.

5. The railroad freight car according to claim 2, wherein said drive mechanism includes an electric motor.

6. The railroad freight car according to claim 2, wherein said drive mechanism includes a mechanical gear system.

7. The railroad freight car according to claim 2, wherein each of said lifting elements has a central pivot bearing disposed on one of said spring brackets, each of said levers is an angular lever being hinge-mounted by one of said central pivot bearings on one of said spring brackets, and each of said levers has one free end being articulatingly connected to one of said link suspension mountings and another free end being articulatingly connected to one of said drive mechanisms.

8. The railroad freight car according to claim 2, wherein each of said levers is a double lever having parts each being mounted on a respective side of said spring bracket.

9. The railroad freight car according to claim 2, including link bolts each mounting a respective one of said link suspension mountings on a respective one of said levers, said link bolts each having a contacting surface bearing frontally against a respective one of said spring brackets when said loading platform is lowered.

10. The railroad freight car according to claim 6, wherein each of said link bolts has longitudinal ends and at least one transverse stop at a distance from said longitudinal ends, said at least one transverse stop being form-lockingly connected to one of said spring brackets horizontally in a transverse direction of the railroad freight car, when said loading platform is lowered.

11. The railroad freight car according to claim 6, wherein each of said link bolts has two spaced apart transverse stops, each bearing from one side against one of said spring brackets when said loading platform is lowered.

12. The railroad freight car according to claim 1 wherein said at least one wheelset is two wheelsets.

13. The railroad freight car according to claim 1 wherein said at least one wheelset is two double-axle running gears.

* * * * *